March 7, 1967   J. J. MAHON ET AL   3,308,315
UNIDIRECTIONAL DRIVE FOR SMALL SYNCHRONOUS MOTORS
Filed Feb. 10, 1964
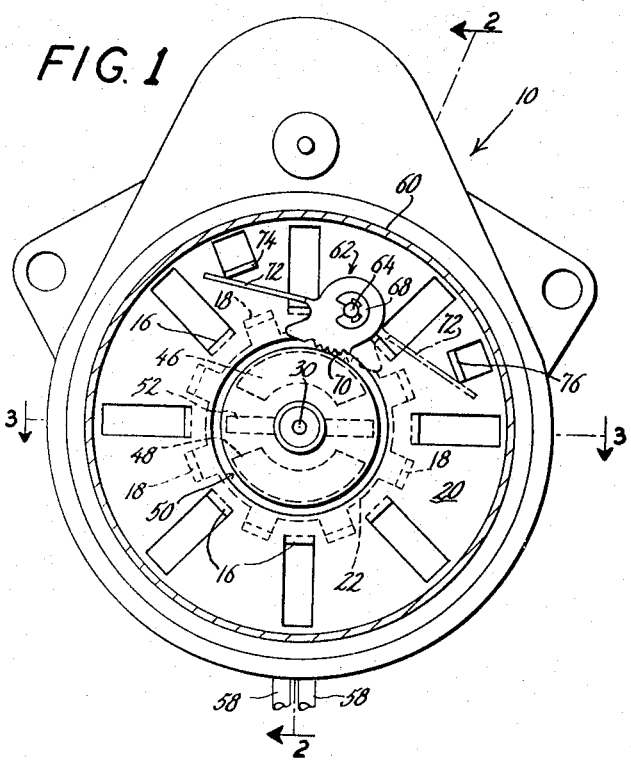
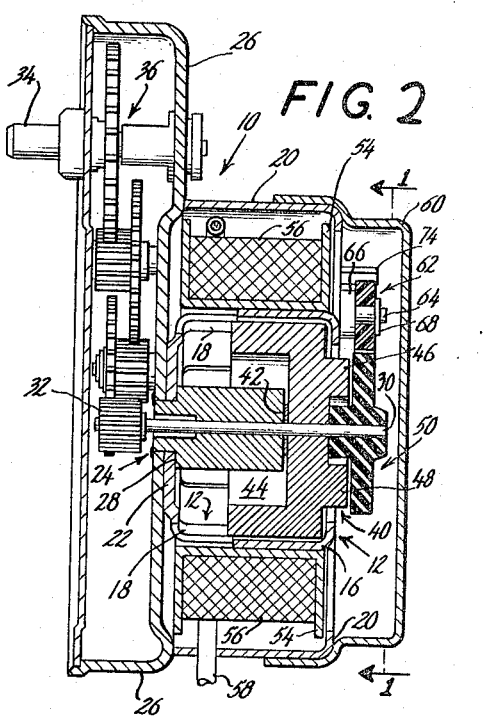
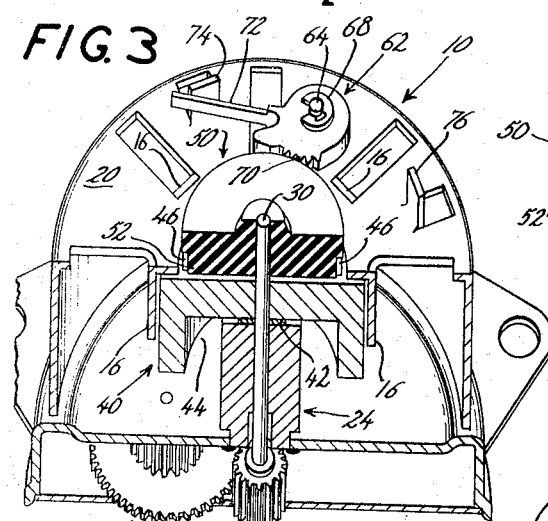
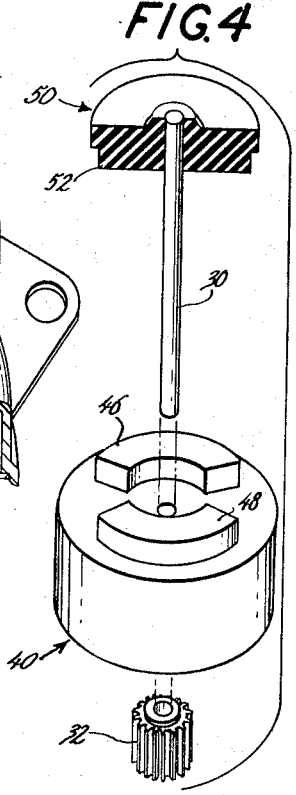
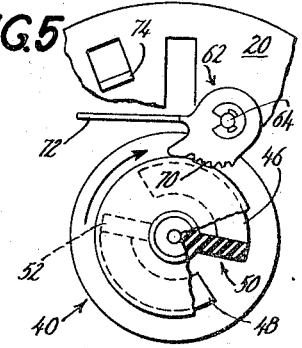
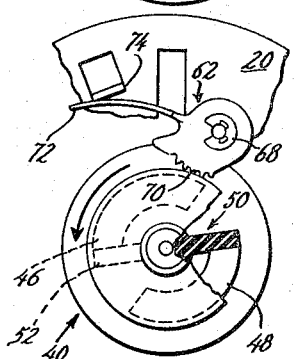
INVENTORS
JOSEPH J. MAHON
RALPH N. ROBERGE
BY
ATTORNEY

United States Patent Office 3,308,315
Patented Mar. 7, 1967

3,308,315
UNIDIRECTIONAL DRIVE FOR SMALL
SYNCHRONOUS MOTORS
Joseph J. Mahon, Litchfield, and Ralph N. Roberge, Waterbury, Conn., assignors to General Time Corporation, New York, N.Y., a corporation of Delaware
Filed Feb. 10, 1964, Ser. No. 343,669
7 Claims. (Cl. 310—41)

This invention relates to an improved unidirectional drive for use with an inductor motor and particularly to a self-starting synchronous motor capable of starting in either direction. Devices of this type are commonly known as no-back mechanisms.

As is well known, motors of this type incorporate a multi-polar field wherein alternate poles possess opposite polarity at a particular instant and change polarity in accord with alternating current applied to an associated field coil. The poles of a magnetized rotor cooperate with the alternate poles for purposes of driving the rotor which in turn drives a shaft or spindle with a pinion fixed thereto. The pinion then drives a gear train that ultimately turns an output shaft which drives a load.

In known motors of this type, the rotor is invariably integral with the pinion drive spindle and a no-back mechanism is usually associated therewith. Such mechanism generally incorporates one or more stop members which collide when the rotor starts in the undesired direction and a ratcheting effect ensues when the rotor starts and continues rotation in the desired direction. In the event of collision, the resulting kickback to the rotor results in reversal thereof and it maintains rotation in the desired direction. This results in satisfactory operation so long as the kick-back to the rotor is of sufficient degree. However, if the motor is under a relatively heavy load, such kick-back is at a minimum and motor stall often results. Moreover, it is well known that motors of this type are prone to so-called operational "blind-spot" conditions which restrict and often prevent sufficient rotor kick-back, particularly following initial start in the undesired direction. A slightly lower input voltage may cause the same effect. In addition to the above operational defects, known apparatus of the collision and ratchet type no-back mechanisms produce objectionable noise. When utilized in conjunction with domestic water circulation apparatus for one example, this clatter is amplified and reverberates within the water piping throughout the home, causing undue discomfort to the occupants.

Motors of the collision no-back type are exemplified in patents issued to R. G. Tetro, 2,789,673; P. H. Morganson, 2,722,615; E. H. Gates, Jr., 2,722,297; Schellens, 2,436,231.

The present invention contemplates the use of a rotor with a lost motion slot formed therein and a no-back disc driven thereby. A known motor incorporating a lost motion arrangement may be found in the Patent 2,788,455, issued to W. Kohlhagen wherein an intricately formed spring acts as a stored energy medium and cooperates with a pair of slots formed in an intermediate gear of the drive train. This arrangement is supplemented by a spring-loaded pawl and disc of undisclosed substance, the disc being fixed on the output shaft which is fast on the last gear in the output train. Such arrangement is untidy from an assembly aspect, relatively expensive and lacks reliability. Such spring arrangement not only adds to a danger element but at its location presents an area of possible torque encroachment.

On the other hand, the present invention provides a novel and extremely simple lost-motion coupling which not only attains a "silent" no-back action but insures maximum operational reliability of a self-starting motor in a predetermined rotational direction at a minimum of cost over Kohlhagen and other existing no-back devices.

Accordingly, it is the prime object of this invention to provide a self-starting synchronous motor with a directional drive control that is superior to the above-mentioned controls by insuring the constancy and magnitude of the torque delivered by the motor while preventing any wear-inducing and unnecessary utilization of play between the gears of the drive train while the motor is in operation.

A further object resides in the provision of an improved rotor construction which allows for a lost motion coupling between rotor and drive spindle.

A still further object is to provide such a rotor that may be temporarily independent of the load driven by the motor when the motor is initially energized.

In keeping with the above objects, a further object is the provision of a no-back element employed to couple with the rotor whereby a noise-free coupling is attained.

It is a related object to provide a no-back mechanism which does not affect operation of the associated motor upon starting in the desired direction but allows the rotor complete freedom to reverse direction when started in the undesired direction.

An additional object is to provide in a no-back mechanism a one-piece element that cooperates with a no-back coupling disc which is fast with a motor pinion drive spindle for insuring that the rotor rotates in a predetermined direction.

In addition to the above objects, it is an important object to provide a no-back mechanism which permits clockwise or counterclockwise rotation of the rotor without modification, requiring only the reversal of a conveniently located one-piece element.

Finally it is an object of substantial importance to provide a no-back mechanism employing the absolute minimum of parts which need not be held to close tolerances and constitute economically manufactured elements.

Other objects and advantages of the invention will become apparent upon reading the following detailed description and upon reference to the drawings in which:

FIG. 1 is an enlarged plan view of a motor embodying the present invention as taken along the lines 1—1 of FIG. 2 and illustraating certain of the elements thereof in a quiescent position;

FIG. 2 is a sectional view thereof as taken substantially along the lines 2—2 of FIG. 1;

FIG. 3 is a perspective view of the motor taken along lines 3—3 of FIG. 1 with certain of the motor units omitted for purposes of clarity;

FIG. 4 is an exploded perspective view illustrating important elements of the invention;

FIG. 5 illustrates the motor rotor at the point of momentary arrest subsequent to its start of rotation in the undesired direction;

FIG. 6 illustrates the motor rotor rotating in the desired direction following the arresting action of FIG. 5;

FIG. 7 is a detail perspective view of the rotor coupled element of the invention and the pinion drive spindle.

Referring to the drawings, and more particularly to FIGS. 1-3 thereof, the reference numeral 10 designates a synchronous motor having a field or stator generally designated by the numeral 12. The field structure comprises two sets of poles 16 and 18 which are provided on separate field members 20 and 22, respectively. The member 20 is in the form of a cup having equally spaced tabs formed downwardly therefrom to constitute a circular series and thus the field poles 16. The member 22 is in the form of a slotted disc having tabs formed upwardly therefrom which are also equiangularly disposed. The latter tabs constitute the field poles 18 which are situated between field poles 16, as seen in FIGS. 1 and 2. A bearing 24 having a reduced portion at one end thereof fits through a clearance hole in member 22 and a similar hole provided in a gear housing 26. Bearing 24 is suitably fixed at its reduced portion to housing 26 as by swaging or the like. A shoulder 28 of bearing 24 rigidly retains member 22. A drive spindle 30 with a pinion 32 pressed thereon is inserted in bearing 24. Pinion 32 serves to drive the output stud shaft 34 of the motor through the usual gear train, generally indicated at 36.

As best seen in FIGS. 2, 3 and 4, a rotor of novel form, generally indicated at 40, which is preferably of phenolic bonded barium ferrite fits loosely on spindle 30 and bears on a disc 42 of low friction material such as a nylon washer. Rotor 40, is alternately magnetically spotted (N, S) at its radial periphery, as is well known in synchronous motor art. Rotor 40 is relieved at its interior as a 44 to afford clearance with bearing 24 and formed at its upper portion to establish segments 46 and 48. The mass of rotor 42 may be increased or decreased in accordance with the contemplated cycle input to the motor. For example, if the motor is to be adapted for 60-cycle operation, area 44 may be formed substantially as shown. For use in a 50-cycle operation, area 44 is decreased to provide greater rotor mass for purposes of greater torque output thereby with a lower cycle input. A resilient no-back disc 50 having a shoulder 52 is formed as best seen in FIG. 7. Disc 50 is fixed on spindle 30 by press fitting and serves as the drive therefor. No-back disc 50 may be entirely formed of a substance commercially known as BUNA N rubber or similar material having resilient characteristics.

It is important to note that in the assembled condition of the motor, shoulder 52 is disposed between segments 46 and 48 and establishes a lost-motion coupling between rotor 40 and disc 50. Shoulder 52 may be of firmer substance than the circular portion of disc 50. Accordingly, it is of no consequence so far as motor operation is concerned whether or not shoulder 52 yields. The important aspect is in the lost-motion arrangement between rotor segments 46, 48 and shoulder 52 of disc 50. However, in the preferred embodiment, disc 50 is molded of a common substance for simplicity and economy. To establish the lost-motion coupling, reference is made to FIGS. 1 and 4 of the drawings wherein it is apparent that the segments 46 and 48 protrude from a substantially planar face of rotor 40. Segments 46 and 48 have peripheral portions of less than 180° with respect to the rotor planar face. The peripheral portions of segments 46 and 48 terminate in axial faces, as best seen in FIG. 4.

The usual bobbin 54 with an energizing coil 56 fixed therein is suitably mounted in the motor (FIG. 2). Coil 56 receives energy from an alternating current source via wires 58 and causes operation of the motor in a well known manner. A motor cover 60 is frictionally pressed on member 20 to encase the upper region of the motor.

A no-back pawl 62 is mounted for pivotal movement on a stud 64 having a shoulder 66 for supporting pawl 62 and spacing it from member 20. Shoulder 66 has a turned down end (not shown) at its base which fits into a hole provided in member 20 and is fixed thereto as by swaging. Pawl 62 is retained on stud 64 by an E-washer 68. No-back pawl 62 is unitary and formed with a set of teeth 70 and a relatively thin extension 72 which possesses resilient characteristics. In the quiescent condition of the motor, teeth 70 touch lightly on the periphery of no-back disc 50 and the extension 72 rests against a tab 74 struck-up from member 20, as best seen in FIGS. 1 and 3.

Pawl 62 may also be formed without teeth 70. That is, a smooth cam surface may cooperate with the periphery of no-back disc 50 and operate satisfactorily. However, it has been found that if a lubricant should accumulate on the periphery of no-back disc 50 unwanted slippage occurs during the arresting action. Teeth 70 not only serve as a more satisfactory gripping medium but also act as a scraper and cleanser.

With particular reference to FIG. 1, if it is desired to have the rotor 40 rotate in a counter-clockwise direction when energy is imparted to coil 56, pawl 62 is mounted as shown in full lines and resilient extension 72 cooperates with tab 74. If it is desired to have the rotor rotate in a clockwise direction when influenced by the coil 56, pawl 62 is flipped over to the position illustrated in dot and dash of FIG. 1 so that extension 72 engages a tab 76 which is also struck-up from member 20. Pawl 62 is conveniently located and simply mounted so that it can be readily reversed without disturbing important elements of the motor.

In FIGS. 5 and 6 the pawl 62 is mounted to insure counter-clockwise rotation of rotor 40. FIG. 5 depicts the action of rotor 40 as its starts from the FIG. 1 position. Rotor 40 starts from the quiescent position free of any load whatever for a few degrees until segments 46 and 48 thereof engage shoulder 52. It is important to note that such engagement is "noiseless" and the shoulder 52 may yield ever so slightly to further cushion the pick-up of no-back disc 50. Now, the no-back disc 50 and the rotor 40 turn for a few more degrees clockwise, as indicated by the arrow in FIG. 5. However, immediately upon pick up of the no-back disc 50 by rotor 40, no-back pawl 62 commences to pivot from the position shown in FIG. 1 to the position shown in FIG. 5 and compresses the contact area of no-back disc 50 through the action of teeth 70. Such action prohibits rotation in the clockise direction and urges the disc 50 and rotor 40 in the anti-clockwise direction. Instantaneously, the rotor, through magnetic action, will reverse direction, rotate freely through the open area between segments 46, 48 and shoulder 52 until engagement is made. Disc 50 will thereafter be rotated in the desired direction, as indicated by the arrow in FIG. 6. By virtue of the characteristic of pawl 62 it will be pivoted clockwise by the periphery of disc 50 being in engagement with teeth 70 until it assumes the FIG. 6 position. The motor now runs unhindered with teeth 70 brushing lightly on the periphery of disc 50.

By the novel construction described it can be readily appreciated that if the arresting action illustrated in FIG. 5 occurred when the motor was under a relatively heavy load any danger of a stall is prevented due to the freedom given the rotor 40. Moreover, if the arresting action took place at a so-called "blind-spot" of the motor or during a period of input voltage fall-off, the rotor 40 would be free to oscillate and cause the motor to run in the desired direction. That is, the rotor 40, by virtue of the lost-motion means established by segments 46, 48 and disc shoulder 52, is free to repeatedly move between thte FIG. 5 and FIG. 6 positions as the source current alternates. By such action, rotor 40 develops sufficient momentum to eventually drive disc 50, spindle 30 and drive pinion 32 fast therewith in the direction exemplified in FIG. 6.

Thus it can be appreciated that the motor of the present invention provides a novel no-back mechanism with a lost-motion coupling between rotor and gear drive which is free of noise during operation, is extremely inexpensive to manufacture and has the utmost reliability over a long period of time.

Having described the invention by making detailed reference to preferred forms of the elements thereof it is obvious that various modifications may be made without departing from the spirit of the invention. It is therefore understood that this invention is not limited to the exact arrangement disclosed except as limited by the state of the art to which this invention pertains.

What is claimed is:
1. In a synchronous motor the combination of:
    alternate field poles,
    a rotor capable of starting and running in a first or a second rotary direction when affected by alternating opposite polarities in said alternate field poles, a driven member capable of rotation in a first and in a second direction, lost-motion coupling means between said rotor and driven member, said rotor capable of establishing a direct driving engagement with said driven member in either of said rotary directions through said lost-motion coupling means, and means for arresting said driven member when rotated by said rotor in said first direction whereby said rotor then runs in said second direction and said driven member is delayedly but unimpededly rotated by said rotor in said second direction through said lost-motion coupling means.

2. The combination defined in claim 1 wherein said arresting means includes an arresting pawl arranged for pivotal movement adjacent to and for engaging said driven member.

3. The combination of claim 2 wherein said pawl includes biasing means, arresting teeth and is of unitary construction.

4. The combination defined in claim 1 wherein said rotor is substantially circular and has a substantially planar face, and said driven member is disc-like in form.

and wherein said lost-motion coupling means comprise a plurality of coupling elements protruding from said rotor planar face, said elements radially spaced to allow an opening therebetween, and a shoulder extending perpendicular from said disc-like driven member, said shoulder freely accommodated within said opening between said coupling elements to thereby establish a lost-motion coupling between said rotor and driven member.

5. The combination of claim 4 wherein said plurality of protruding coupling elements are further defined as a pair of circular segments having radial peripheral portions terminated by axial faces, each of said radial peripheral portions encompassing less than 180° with respect to said rotor planar face whereby said axial faces establish said lost-motion coupling.

6. The combination of claim 4 wherein said driven member is unitary and is of yieldable substance.

7. In a synchronous motor having a gear train for rotating an output shaft, the combination of:

alternate field poles, a rotor capable of starting and running in a first or a second direction when affected by alternate opposite polarities in said alternate field poles, said rotor having a substantially planar face with a central opening therein, a drive spindle supported for rotary movement in said rotor central opening, a pinion fixed on one portion of said drive spindle, said pinion constituting the initial drive in said gear train, a driven member of yieldable substance capable of rotation in a first or a second direction fixed on another portion of said drive spindle and for driving said spindle in unison therewith, coupling shoulder on said driven member, coupling means on said rotor capable of establishing a driving connection with said driven member in either of said rotary directions through said coupling shoulder, a pawl adapted for pivotal movement adjacent to and urged into engagement with said driven member, and projections on said pawl for arrestingly engaging said driven member when rotated by said rotor coupling means in said first direction whereupon said rotor is then capable of running in said second direction and unimpededly rotates said driven member therewith.

References Cited by the Examiner
UNITED STATES PATENTS

| | | | |
|---|---|---|---|
| 2,633,950 | 4/1953 | Phaneuf | 310—41 |
| 3,101,137 | 8/1963 | De Barba | 310—41 |
| 3,211,933 | 10/1965 | Kohlhagen | 310—164 |

MILTON O. HIRSHFIELD, *Primary Examiner.*

L. L. SMITH, *Assistant Examiner.*